United States Patent [19]

Buros et al.

[11] 4,004,058

[45] Jan. 18, 1977

[54] RE-ENCODING LABEL

[75] Inventors: Melvin S. Buros; William B. Buros, both of Phoenix, Ariz.

[73] Assignee: Micr-Shield Company, Phoenix, Ariz.

[22] Filed: July 17, 1975

[21] Appl. No.: 596,579

[52] U.S. Cl. .................. 428/215; 283/21; 428/40; 428/41; 428/216; 428/343; 428/354; 428/513; 428/516; 428/914

[51] Int. Cl.² .................. B32B 7/12; C09J 7/02

[58] Field of Search ........... 428/215, 216, 343, 40, 428/41, 916, 914, 354, 513, 514, 517, 516; 283/21; 427/7

[56] References Cited

UNITED STATES PATENTS

| 1,622,329 | 3/1927 | MacCordy | 427/7 |
| 3,634,546 | 1/1972 | Haggmeyer et al. | 428/513 |
| 3,684,643 | 8/1972 | Stepp | 428/513 |
| 3,702,924 | 11/1972 | Wood et al. | 428/343 |

Primary Examiner—Thomas J. Herbert, Jr.
Attorney, Agent, or Firm—Cahill, Sutton & Thomas

[57] ABSTRACT

A label is disclosed having pressure-sensitive adhesive thereon for application to the clear band of a document to be processed through a sorter/reader. The label is multi-layered having a tissue paper surface for receiving magnetic ink thereon and includes a heat-laminated, low density polyethylene layer beneath the tissue forming a bond with a layer of rigid polyvinylchloride (PVC). A pressure-sensitive adhesive is secured to the PVC layer with well known electrostatic adhesion techniques.

2 Claims, 2 Drawing Figures

RE-ENCODING LABEL

The present invention pertains to systems to facilitate re-encoding of erroneously encoded magnetic ink (MICR) character recognition documents. More specifically, the invention pertains to a label for placement on a document over MICR characters to permit re-encoding of the document.

Data processing systems may be utilized through the expediency of numerous types of input/output equipment; the basic purpose of such equipment is to place the information to be provided to the data processor in an appropriate form for machine reading. The source documents containing the information to be supplied to the data processing system may be encoded in machine readable form so that automatic reading equipment can sense the information, translate the information into appropriate electrical form for utilization by the processor. One such document encoding system used by many organizations, most notably banks, is the magnetic coding of information on the document. For example, checks have been essentially standardized in size and format so that they may be processed utilizing automatic reading and sorting equipment. To this end, checks have been standardized incorporating a "clear band" extending along the bottom of the check in which certain information is placed in machine readable form.

The information placed in the clear band is standardized and referred to as MICR characters. These characters appear on the bottom of the check as printed numbers and symbols which have been printed in an ink containing magnetizable particles therein; when the information contained on the document is to be "read", the document is passed through a sorter/reader which first magnetizes the magnetizable particles and then detects the magnetic field of the symbols resulting from the magnetic retentivity of the ink. The characters and symbols placed in the clear band are generally segregated into three separate fields. The first of these fields ("transit field") will contain the appropriate symbols and characters to identify a bank, bank branch, etc. The second field ("on us field") will contain the account number affected by the transaction. These first two fields will typically be "pre-encoded"; that is, they will be placed on the check before the bank sends the check to the customer for his use.

The third field ("amount field") obviously cannot be pre-encoded since the amount for which the check is drawn will not be known until it is used. Accordingly, after the check has been presented to the bank for payment and is to be processed through its various data processing systems, the amount of the check must be encoded at the appropriate location on the clear band prior to the introduction of the document to a sorter/reader. This latter step in the encoding of a check is commonly referred to as "post encoding" and is typically accomplished with special encoding machines having a keyboard operated by an individual who observes the amount of the check and encodes the amount in MICR characters in the amount field of the clear band.

Since post encoding is performed by human operators, it is not uncommon for errors to occur and for the wrong amount to be post encoded in the clear band. There are several techniques presently in use for correcting the problems caused by such erroneous encoding. One such technique is the utilization of a "label" which is placed over the erroneous MICR encoding and which presents a clean surface for the receipt of re-encoding MICR characters thereon.

Prior art labels exhibit several drawbacks. For example, it is not uncommon for critical information to be placed on a check in the clear band. Such information as a driver's license number, credit card numbers, or even portions of a signature may extend into the clear band at the amount field (this information is sometimes placed there simply because the amount field is blank at the time the information is placed on the check). Prior art labels therefore not only cover the erroneously encoded characters but will also frequently cover portions of the signature and identification information. Further, banks generally dislike calling attention to the fact that they commited an error and prior art labels usually direct the customer's attention to that very fact when the checks are returned to the customer after they have been paid.

An additional difficulty with prior art labels stems from the requirement of the banks to maintain an audit trail and to take precautions against defalcation. If the underlying erroneously encoded amount is to be checked after the label has been placed thereover, prior art labels must frequently be removed from the processed check; unfortunately, the paper from which checks are made is readily defaced and torn, thus making the removal of a label a fairly destructive act. In most instances, all checks are microfilmed by the processing bank and the use of a prior art label, while indicating that the check had originally been erroneously encoded, will not permit the information positioned beneath the label to be recorded on the film.

In some instances, checks are not erroneously encoded in the amount field but rather will indicate the wrong branch; this latter instance occurs when a customer changes branches but continues to use checks previously provided to him. Thus, the labels are sometimes used as a means for correcting pre-encoded information as well as post encoded information.

It is therefore an object of the present invention to provide a re-encoding label that may be placed over erroneously encoded MICR characters to enable the document to be re-encoded.

It is another object of the present invention to provide a re-encoding label that incorporates an appropriate surface for the receipt of MICR ink while nevertheless permitting optical inspection of the information contained beneath the label.

It is still another object of the present invention to provide a re-encoding label that permits microfilming of the re-encoded document wherein an inspection of the microfilm will reveal the use of a re-encoding label as well as the detection of the information contained on the document beneath the label.

These and other advantages of the present invention will become more apparent to those skilled in the art as the description thereof proceeds.

Briefly, in accordance with one embodiment of the present invention, a label is formed incorporating multiple layers bonded together to form a translucent strip that may be cut into convenient label size. The strip is formed of a thin tissue paper top layer that, while not being thin enough to be transparent, is nevertheless thin enough to permit the ready optical inspection of information on the document beneath the label. The tissue is heat-laminated to a low density polyethylene layer that forms a bond between the tissue and a rigid poly-vinylchloride layer. A pressure-sensitive adhesive adheres to the bottom of the rigid PVC layer and is used as the means for attaching the label to a document to be re-encoded. A release paper layer is removably applied to the adhesive layer to permit the labels to be handled prior to use.

The present invention may be more readily described by reference to the accompanying drawings in which.

Figure 1:
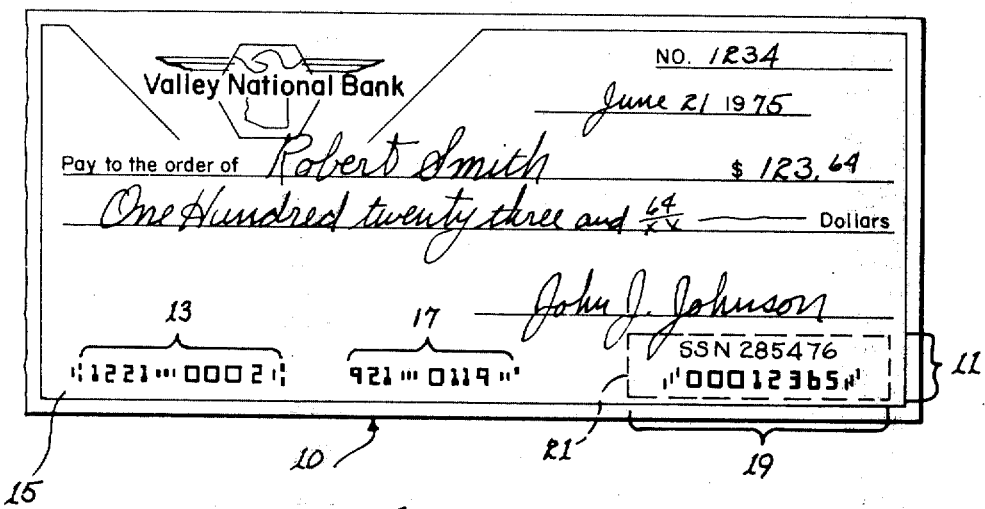
FIG. 1 is an illustration of a typical bank check showing the use of the label of the present invention.

Referring now to FIG. 1, a typical check is shown including the previously mentioned clear band 11 extending along the bottom of the check (the clear band has been standardized in the banking industry at 5/8 inch depth along the entire length of the check). A transit field 13 is positioned in the clear band 11 and includes appropriate symbols 15 designating the field; further, characters appearing in the field identify the bank, bank branch, etc. The second field 17, the "on us" field, contains information relating to the account number affected by the transaction. A third field 19 represents the "amount" field and includes the dollar amount of the transaction. For purposes of illustration it will be assumed that the amount encoded in the field 19 was originally erroneous. The amount of the check is $123.64, whereas the amount field had been encoded for $123.65. To correct this error, a label 21 has been placed over the erroneous encoding to permit the subsequent re-encoding of the correct amount in the amount field. It may be noted that the signature on the check as well as an identification number (typically a social security number) has been placed in an interfering position in the amount field.

As described above, it is important not to obliterate any portion of the endorsing signature or any other information contained in that area of the check. If a transparent label were used, the underlying information would be visible; however, the materials generally available for transparent labels do not provide an appropriate base to receive and retain the magnetic ink required for re-encoding. The top surface of the label must be capable of receiving, and retaining, the MICR ink without smearing or running and without permitting any voids of eight mils or greater to occur in the ink at any point. It must also provide a support for clear sharp edges of the MICR characters and not permit significant migration of the ink into the label's fibers or pores. The label must provide these requirements regardless of the make or manufacture of the transfer tape used in the post encoding machine. Upon inspection of the microfilm photograph of the check, it would be difficult to determine whether or not the amount had been re-encoded since the transparent label would not readily appear on the microfilm negative.

If the label 21 were chosen from a typical prior art label that is opaque, the important information such as portions of signatures, identification numbers, etc. would be lost (it will be remembered that attempted removal of the label is generally destructive of the check).

Many attempts have been made in the prior art to utilize readily available adhesive materials cut to label form and size to overcome the above-mentioned difficulties. Laminations have been used, including a layer of thin paper combined with an acetate layer; such labels were not entirely satisfactory and were followed by a label comprising essentially a layer of etched acetate. Unfortunately, the latter labels would accept only certain types of MICR printing systems using specific film-backed MICR transfer types. The label of the present invention may be seen by reference to FIG. 2.

Figure 2:
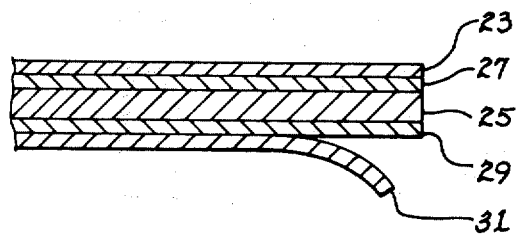
FIG. 2 is a cross-sectional view of the label of the present invention.

Referring to FIG. 2, the label of the present invention includes a top layer 23 of tissue paper having a thickness of one to one-and-one-half mils. This layer is formed from standard No. 1 grade bleached kraft tissue commonly known in the trade as "salesbook" tissue. The tissue is machine-finished, that is, it is smooth but not glazed on either side. The weight of the paper, in the commonly accepted grading system, is "14 lb. tissue". The grading system refers to the fact that a ream (480 sheets of 24 by 36 inch dimensions) weighs 14 pounds plus or minus five percent. The above-specified tissue is readily, commercially available and forms an excellent base for the receipt of MICR inks while nevertheless being thin enough to be classified as translucent to permit optical inspection of the information contained on a check over which it is placed. The translucency of the tissue layer 23 may be established through the use of a densitometer to measure the relative light transmission through the tissue paper. Using the scale typically used by printers (where "0" represents completely transparent, and "100" represents opaque), the range of translucency found to be acceptable for the tissue in the label of the present invention extends from a low of 15 to a high of 57. The layer 23 is laminated to a layer of rigid PVC 25 through the expediency of a 0.5 mil clear layer 27 of low density polyethylene. The layer 27 is not important to the present invention except that the low density polyethylene forms a convenient bond between the tissue and PVC through the use of well known heat-laminating techniques. Other adhesive techniques may be used but have been found to be less convenient. The choice of the rigid PVC layer 25 is, however, critical to the present invention.

Prior art laminated labels have attempted to use soft PVC in a layer structure similar to that shown in FIG. 2 but have been generally unsuccessful in that soft PVC presented significant problems. The PVC layer 25, as stated above, is formed of an approximately 3-mil to 4-mil sheet of clear, rigid PVC. As used herein, the term "rigid PVC" is the commonly accepted industry designation of a substantially unplasticized polyvinylchloride. Several additives are frequently used with PVC to increase strength, to improve electrical characteristics, to render the material more pliable, etc. Additives such as commercially available DOP dioctyl pthlate are frequently used to render the PVC more flexible such as when the material is to be used as an upholstering material, wrapping material, etc. Such additives are generally referred to in the industry as plasticizers. Prior art attempts to produce a laminated label have generally been unsuccessful when such plasticized PVCs were used; it was found that the transfer of MICR inks to such prior art labels frequently resulted in blurring or distortions of the MICR characters, thereby effectively rendering use of the label ineffective as a data processing input.

The PVC layer 25 is therefore formed of a substantially unplasticized (less than 10% by weight plasticizer) polyvinylchloride that is clear and is formed using a calender process. The label of the present invention includes a pressure-sensitive adhesive layer 29 of approximately 0.5 mils thickness covered by a layer of release paper 31. The release paper 31 forms no part of the present invention and is merely provided as a temporary covering for the pressure-sensitive adhesive 29 to permit the label to be stored and handled prior to use. A variety of commercially available pressure-sensitive adhesives may be used; however, it has been found that adherence of the adhesive to the rigid PVC may more readily be accomplished through the use of electrostatic techniques that are currently utilized in the manufacture of a variety of adhesive tapes.

The labels of the present invention are produced in sheet form and are subsequently die-cut to an appropriate size for covering the amount field of an erroneously encoded document. (This size is also appropriate for covering the other fields as well). The labels, mounted on the release paper backing, are then wound into rolls for storage until use. In use, when an erroneously encoded document is to be re-encoded, the label of the present invention is removed from its backing paper and placed on the check over the erroneous encoding. The pressure-sensitive adhesive adhers to the check and the tissue layer presents an appropriate surface for the receipt of new MICR encoding ink. The label is translucent; that is, the thickness of the tissue permits optical inspection of the area beneath the label. However, when the check is microfilmed, the presence of the label is clearly defined while the underlying information located in the field beneath the label remains optically available for inspection. The label, which remains visible, nevertheless appears to assume the color of the check upon which it is placed (including the design on the check such as water markings), thereby rendering its appearance unobvious and unobjectionable. The overall thickness of the label (5 to 6 mils) is sufficient to prevent the "bleed through" of the magnetic fields of the erroneously encoded characters beneath the label while nevertheless not seriously affecting the overall thickness of the document so as to interfere with the machine processing thereof.

We claim:

1. A multi-layered re-encoding label for attachment to an erroneously encoded document for covering MICR characters present thereon and for permitting encoding of new MICR characters thereon, said label comprising:
   a. a layer of bleached kraft tissue paper of a thickness of from 1 mil to 1.5 mils and having a relative translucency of from 15 to 57;
   b. a layer, from 3 to 4 mils thickness, of substantially unplasticized rigid polyvinylchloride;
   c. a layer of low density polyethylene securing said layer of tissue paper to said layer of rigid polyvinylchloride; and
   d. a layer of pressure-sensitive adhesive on said rigid polyvinylchloride to permit the adhesive placement of said label on a document.

2. The label of claim 1, wherein said layer of low density polyethylene is less than 0.5 mils thick.

* * * * *